US011546693B2

(12) United States Patent
Choi et al.

(10) Patent No.: US 11,546,693 B2
(45) Date of Patent: Jan. 3, 2023

(54) METHOD FOR GENERATING AUDIO SIGNAL USING PLURALITY OF SPEAKERS AND MICROPHONES AND ELECTRONIC DEVICE THEREOF

(71) Applicant: Samsung Electronics Co., Ltd., Gyeonggi-do (KR)

(72) Inventors: Hyunmin Choi, Gyeonggi-do (KR); Gangyoul Kim, Gyeonggi-do (KR); Yang-Su Kim, Gyeonggi-do (KR); Youngsoo Park, Gyeonggi-do (KR); Nam-Woog Lee, Gyeonggi-do (KR); Keun Won Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 16/648,784

(22) PCT Filed: Oct. 17, 2018

(86) PCT No.: PCT/KR2018/012222
§ 371 (c)(1),
(2) Date: Mar. 19, 2020

(87) PCT Pub. No.: WO2019/178597
PCT Pub. Date: Apr. 25, 2019

(65) Prior Publication Data
US 2020/0288243 A1 Sep. 10, 2020

(30) Foreign Application Priority Data
Oct. 17, 2017 (KR) .................. 10-2017-0134886

(51) Int. Cl.
*H04R 3/02* (2006.01)
*H04N 7/14* (2006.01)
(Continued)

(52) U.S. Cl.
CPC ............... *H04R 3/02* (2013.01); *H04N 7/142* (2013.01); *H04N 7/147* (2013.01); *H04R 1/403* (2013.01);
(Continued)

(58) Field of Classification Search
USPC ... 381/71.14, 93, 94.1, 94.3, 94.5, 94.8, 377
See application file for complete search history.

(56) References Cited

U.S. PATENT DOCUMENTS

2011/0050840 A1 3/2011 Ryu et al.
2014/0169601 A1 6/2014 Pedersen
(Continued)

FOREIGN PATENT DOCUMENTS

KR 10-1378656 B1 3/2014
KR 10-1446645 B1 10/2014
(Continued)

OTHER PUBLICATIONS

Korean Search Report dated Jun. 30, 2021.
Korean Notice of Patent Grant dated Jan. 10, 2022.

*Primary Examiner* — Yosef K Laekemariam
(74) *Attorney, Agent, or Firm* — Cha & Reiter, LLC

(57) ABSTRACT

A method for canceling an echo and an electronic device thereof are provided. The electronic device includes a housing, a communication module, a first speaker disposed in a first region of the housing, a second speaker disposed in a second region of the housing, a first microphone disposed adjacent to the first region, a second microphone disposed adjacent to the second region, and a processor. The processor is configured to receive a first audio signal from an external electronic device, and output a first given frequency band, and output a second given frequency band, and provide a first signal by applying a filter capable of passing a band corresponding to the second given frequency band, and provide a second signal by applying a filter capable of
(Continued)

passing a band corresponding to the first given frequency band, and provide a second audio signal corresponding to the external audio signal, and transmit the second audio signal to the external electronic device.

13 Claims, 10 Drawing Sheets

(51) Int. Cl.
*H04R 1/40* (2006.01)
*H04R 3/12* (2006.01)

(52) U.S. Cl.
CPC .............. *H04R 1/406* (2013.01); *H04R 3/12* (2013.01); *H04R 2430/20* (2013.01)

(56) References Cited

U.S. PATENT DOCUMENTS

| | | |
|---|---|---|
| 2016/0269531 A1 | 9/2016 | Lee et al. |
| 2017/0070839 A1 | 3/2017 | Mihelich et al. |
| 2017/0155756 A1* | 6/2017 | Kim ..................... H04M 9/085 |

FOREIGN PATENT DOCUMENTS

| | | | | |
|---|---|---|---|---|
| KR | 10-2016-0109359 A | 9/2016 | | |
| KR | 10-2017-0062331 A | 6/2017 | | |
| KR | 20170062331 | * 6/2017 | .............. H04M 1/60 |

* cited by examiner

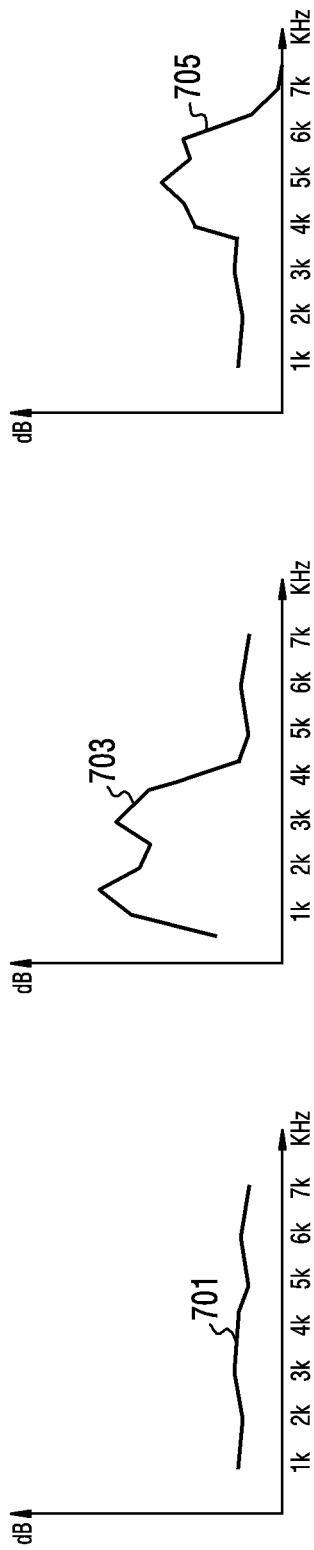
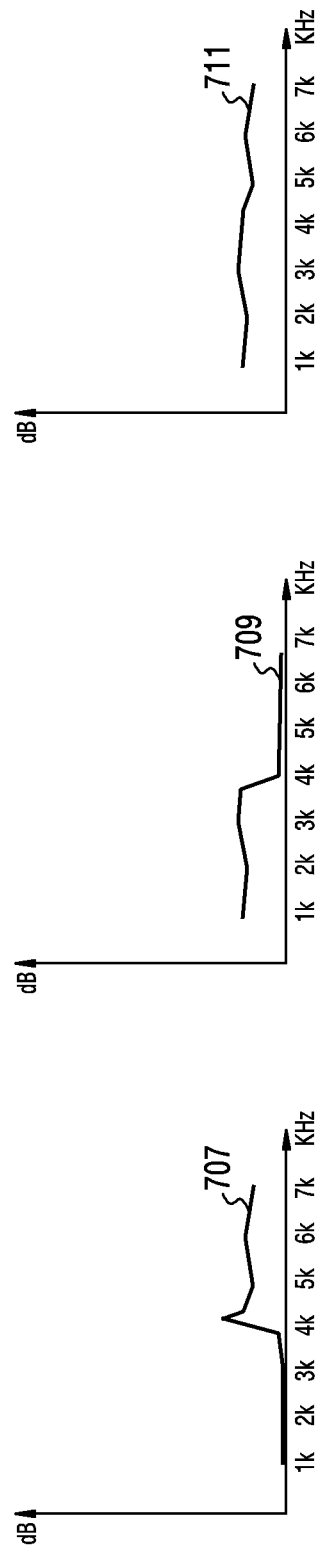

METHOD FOR GENERATING AUDIO SIGNAL USING PLURALITY OF SPEAKERS AND MICROPHONES AND ELECTRONIC DEVICE THEREOF

CLAIM OF PRIORITY

This application is a National Phase Entry of PCT International Application No. PCT/KR2018/012222, which was filed on Oct. 17, 2018, and claims a priority to Korean Patent Application No. 10-2017-0134886, which was filed on Oct. 17, 2017, the contents of which are incorporated herein by reference.

TECHNICAL FIELD

Various embodiments of the present disclosure disclose a method for providing an audio signal by using a plurality of speakers and microphones and an electronic device thereof.

BACKGROUND ART

To increase a user's convenience, an electronic device can provide various services. For example, the electronic device can provide various multimedia services such as a broadcasting service, a wireless Internet service, a camera service, a voice reproducing service, etc., an audio service using an audio signal detected through a microphone such as a recording service, a phone call service, a video conference service, etc., and the like.

In recent years, at audio service provision, to detect a user's voice more accurately, the number of microphones installed in the electronic device is increasing gradually. Accordingly, even a quality of the audio service is being improved gradually.

DISCLOSURE OF INVENTION

Technical Problem

When an electronic device provides an audio service, an echo phenomenon can occur in which at least part of an output audio signal outputted via a speaker of the electronic device is introduced via a microphone of the electronic device and is transmitted to an external electronic device.

Accordingly, the electronic device is preventing the echo phenomenon caused by the single speaker, by using a plurality of microphones installed in the electronic device. For example, the electronic device can detect an input audio signal much including an audio signal component outputted from the single speaker, through a microphone disposed in a location adjacent to the single speaker, and can detect an input audio signal less including an output audio signal component outputted from the single speaker, through a microphone disposed in a location distant away from the single speaker. The electronic device can attenuate the output audio signal component outputted from the speaker by using the detected two input audio signals, thereby preventing the echo phenomenon caused by the single speaker.

In recent years, to provide a louder sound volume and provide a sound in three dimensions, the number of speakers installed in the electronic device is increasing. In this case, all input audio signals detected through a plurality of microphones can much include output audio signal components outputted from the speakers. Accordingly, there is a problem in which the electronic device is difficult to cancel the output audio signal component in the above-described echo cancellation method.

Various embodiments of the present disclosure for solving the above-described problem disclose a method for canceling an echo by using a plurality of microphones in an electronic device with a plurality of speakers.

Solution to Problem

According to various embodiments of the disclosure, an electronic device may include a housing, a communication module, a first speaker disposed in a first region of the housing, a second speaker disposed in a second region of the housing, a first microphone disposed adjacent to the first region, a second microphone disposed adjacent to the second region, and a processor. The processor may be configured to receive a first audio signal from an external electronic device, by using the communication module, and output a first given frequency band among a frequency band of the first audio signal by using the first speaker, and output a second given frequency band among the frequency band of the first audio signal by using the second speaker, and provide a first signal by applying a filter capable of passing a band corresponding to the second given frequency band to an audio signal external to the electronic device which is acquired using the first microphone, and provide a second signal by applying a filter capable of passing a band corresponding to the first given frequency band to the audio signal external to the electronic device which is acquired using the second microphone, and provide a second audio signal corresponding to the external audio signal by using the first signal and the second signal, and transmit the second audio signal to the external electronic device by using the communication module.

According to various embodiments of the disclosure, an electronic device may include a communication module, a first speaker, a second speaker, a first microphone, a second microphone, and a processor. The processor may be configured to output a first output audio signal on a first band, via the first speaker, and output a second output audio signal on a second band, via the second speaker, and identify a first partial audio signal on the second band within a first input audio signal obtained through the first microphone, and identify a second partial audio signal on the first band within a second input audio signal obtained through the second microphone, and provide a transmission audio signal, based at least on the first partial audio signal and the second partial audio signal, and transmit information about the transmission audio signal to an external electronic device via the communication module.

According to various embodiment of the disclosure, an operation method of an electronic device may include outputting a first output audio signal on a first band, via a first speaker, and outputting a second output audio signal on a second band, via a second speaker, and identifying a first partial audio signal on the second band within a first input audio signal obtained through a first microphone, and identifying a second partial audio signal on the first band within a second input audio signal obtained through a second microphone, and providing a transmission audio signal, based at least on the first partial audio signal and the second partial audio signal, and transmitting information about the transmission audio signal to an external electronic device.

Advantageous Effects of Invention

Various embodiments of the present disclosure may prevent an echo phenomenon, by canceling an output audio signal component outputted from a speaker adjacent to each microphone among an input audio signal obtained from a plurality of microphones, in an electronic device with the plurality of speakers and microphones.

BRIEF DESCRIPTION OF DRAWINGS

FIG. 7 is a diagram for explaining an input audio signal obtained through a microphone in an electronic device according to various embodiments.

BEST MODE FOR CARRYING OUT THE INVENTION

Figure 1:
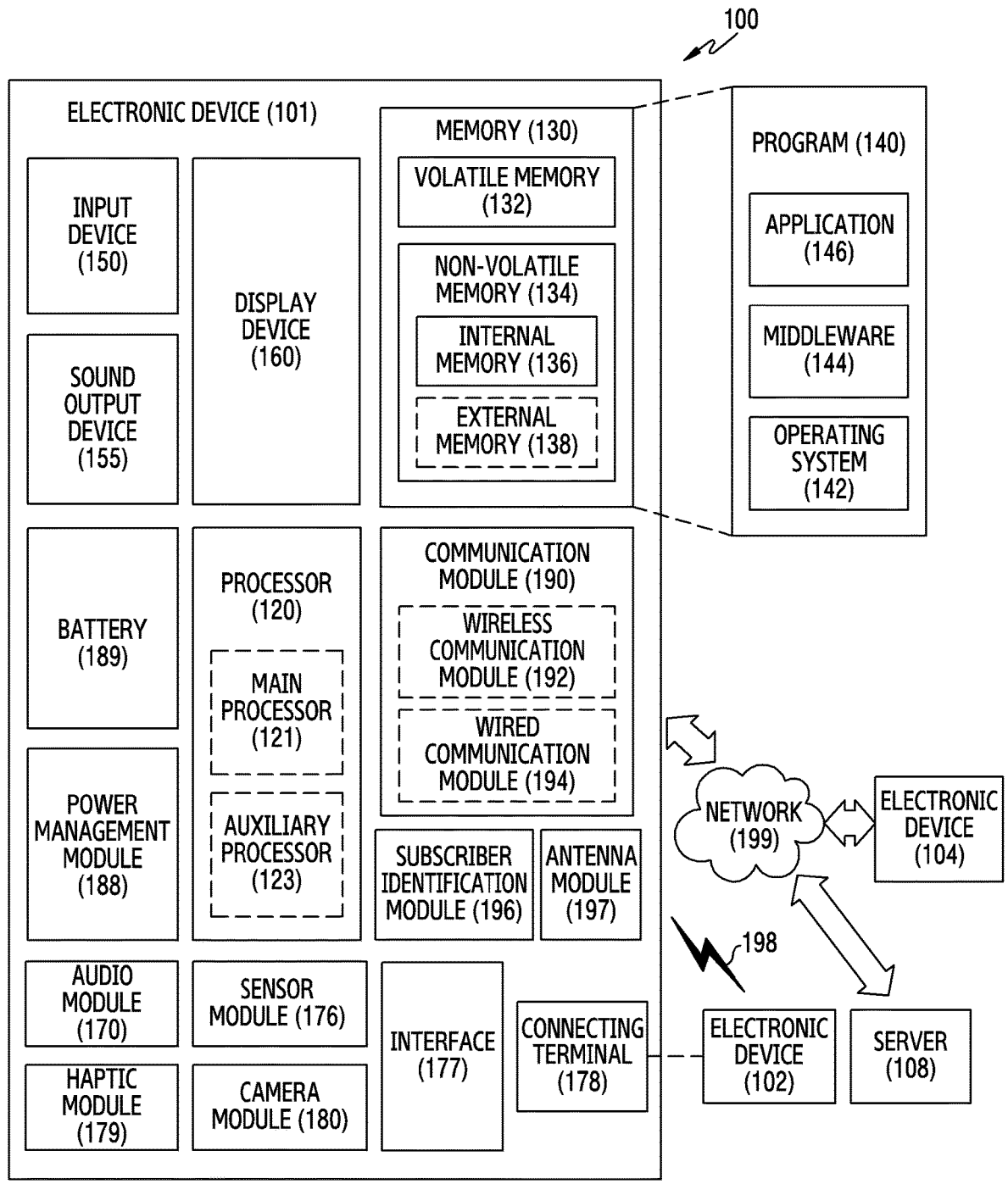
FIG. 1 is a block diagram of an electronic device of providing an audio signal by using a plurality of speakers and microphones within a network environment according to various embodiments.

FIG. 1 is a block diagram of an electronic device 101 of providing an audio signal by using a plurality of speakers and microphones within a network environment 100 according to various embodiments.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment, the electronic device 101 may communicate with the electronic device 104 via the sever 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiment, at least one (e.g., the display device 160 or the camera module 180) of the components may be omitted from the electronic device 101, or other components may be added in the electronic device 101. In some embodiment, for example, like the sensor module 176 (e.g., a fingerprint scan sensor, an iris scan sensor, or an illuminance sensor) embedded in the display device 160 (e.g., the display), some components may be integrated and implemented.

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) on a volatile memory 132 and process the same, and store the resultant data in a nonvolatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, and additionally or alternatively, uses lower power than the main processor 121, or is specialized for a given function. The auxiliary processor 123 may be embedded in or be separate from the main processor 121 and be operated.

In this case, the auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data about a command related to this. The memory 130 may include the volatile memory 132 or the nonvolatile memory 134. According to an embodiment, the memory 130 may store tuning table information that includes a setting value related to a band of an output audio signal that is to be outputted via the sound output device 155. The tuning table information may include setting values (e.g., frequency bands) of a first band and a second band such that in response to the sound output device 155 including a plurality of speakers, an output audio signal on the first band may be outputted via a first speaker among the plurality of speakers, and an output audio signal on the second band may be outputted via a second speaker. According to an embodiment, the setting values of the tuning table information may be refined based on a user's input or information received from an external electronic device (e.g., the electronic device 102 or 104 or the sever 108). For example, the setting values of the tuning table information may be refined based on a user's input to a user interface provided to refine the setting value of the turning table information. According to an embodiment, the tuning table information may be stored in the processor 120 as well.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101, and may include, for example, a mouse or a keyboard. According to an embodiment, the input device 150 may include a plurality of microphones. For example, the input device 150 may include the same number of microphones as the number of speakers provided in the electronic device 101. According to an embodiment, one microphone may be disposed in a location adjacent to one speaker. Accordingly, an input audio signal obtained from one microphone may much include a component of an output audio signal outputted from one speaker adjacent to the one microphone.

The sound output device 155 may output a sound signal to the outside of the electronic device 101, and may include, for example, a speaker which is used for general use such as multimedia reproduction or record reproduction and a receiver which is used only for call reception. According to an embodiment, the receiver may be formed integrally with or separately from the speaker. According to an embodiment, the sound output device 155 may include a plurality of speakers. In this case, the plurality of speakers may be configured to output audio signals on mutually different bands.

The display device 160 may visually provide information to a user of the electronic device 101, and may include, for example, a display, a hologram device, or a projector and control circuitry to control a corresponding one of the display, hologram device, and projector. According to an embodiment, the display device 160 may include a touch circuitry or a pressure sensor capable of measuring an intensity of a pressure of a touch.

The audio module 170 may convert a sound and an electrical signal interactively. According to an embodiment, the audio module 170 may obtain the sound via the input device 150, or output the sound via the sound output device 155 or an external electronic device (e.g., the electronic device 102 (e.g., a speaker or a headphone)) wiredly or wirelessly coupled with the electronic device 101.

The sensor module 176 may provide an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a given protocol capable of wiredly or wirelessly coupling with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector capable of physically coupling the electronic device 101 and an external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101, and may be, for example, constructed as at least part of a power management integrated circuit (PMIC).

The battery 189 may supply power to at least one component of the electronic device 101, and may include, for example, a non-rechargeable primary cell, a rechargeable secondary cell or a fuel cell.

The communication module 190 may support establishing a wired communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). By using a corresponding communication module among them, the communication module 190 may communicate with an external electronic device via the first network 198 (e.g., a short-range communication network such as Bluetooth, WiFi direct or infrared data association (IrDA)) or the second network 199 (e.g., a long-range communication network such as a cellular network, the internet, or a computer network (e.g., LAN or WAN)). The aforementioned several kinds of communication modules 190 may be implemented as one chip or may be each implemented as a separate chip.

According to an embodiment, the wireless communication module 192 may distinguish and authenticate the electronic device 101 within a communication network by using user information stored in the subscriber identification module 196.

The antenna module 197 may include one or more antennas for transmitting a signal or power to the external or receiving from the external. According to an embodiment, the communication module 190 (e.g., the wireless communication module 192) may transmit a signal to an external electronic device via an antenna suitable to a communication scheme, or may receive from the external electronic device.

Some components among the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The electronic devices 102 and 104 each may be a device of the same or different type from that of the electronic device 101. According to an embodiment, all or some of operations executed in the electronic device 101 may executed in other one or a plurality of external electronic devices. According to an exemplary embodiment, in response to the electronic device 101 having to perform some function or service automatically or by a request, the electronic device 101 may, instead of or additionally to executing the function or service in itself, send a request for at least a partial function associated with this to the external electronic device. The external electronic device receiving the request may execute the requested function or additional function, and forward the result to the electronic device 101. The electronic device 101 may process the received result as it is or additionally, to provide the requested function or service. To that end, a cloud computing, distributed computing, or client-server computing technology may be used, for example.

Figure 2:
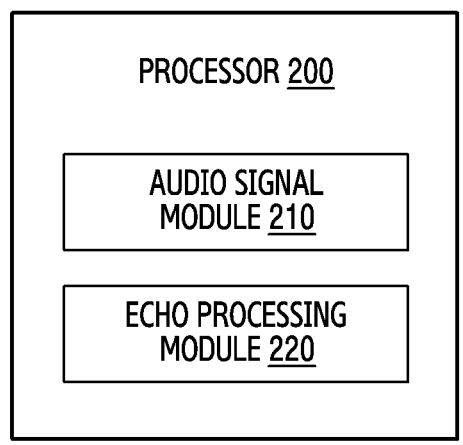
FIG. 2 is a block diagram of a processor including a function of an audio module according to various embodiments.

FIG. 2 is a block diagram of a processor including a function of an audio module according to various embodiments.

Referring to FIG. 2, the processor 200 (e.g., the processor 120) may include at least one of an audio signal module 210 or an echo processing module 220.

According to an embodiment, in response to information about a reception audio signal being received from an external electronic device via a communication module (e.g., the communication module 190), the audio signal module 210 may identify a band of an output audio signal to be outputted via a plurality of speakers. For example, the audio signal module 210 may load tuning table information stored in a memory (e.g., the memory 130). By identifying a setting value (e.g., band) set to each of the plurality of speakers from the turning table information, the audio signal module 210 may identify a band of an output audio signal to be outputted via each speaker. For another example, in response to information about a reception audio signal being received from the external electronic device (e.g., the electronic device 104 and the server 108) via the communication module, the audio signal module 210 may analyze a band of the reception audio signal, thereby identifying a band of an output audio signal to be outputted via the plurality of speakers. For example, the audio signal module 210 may identify the band of the reception audio signal, based on the information about the reception audio signal. To divide the band of the reception audio signal by the number of the plurality of speakers, the audio signal module 210 may identify at least one reference frequency. The audio signal module 210 may divide the band of the reception audio signal according to the identified at least one reference frequency, thereby identifying the band of the output audio signal to be outputted from each of the plurality of speakers. In this case, a width of the band of the reception audio signal divided according to the at least one reference frequency may be set identically.

According to an embodiment, the audio signal module 210 may output an output audio signal on a mutually different band from each of a plurality of speakers, based on a setting value set to each of the plurality of speakers. For example, in response to an electronic device including two speakers, the audio signal module 210 may output an output audio signal on a first band via a first speaker among the two speakers, and output an output audio signal on a second band which does not overlap with the first band, via the second speaker.

According to an embodiment, in response to a plurality of speakers including a directional speaker, the audio signal module 210 may change a directional axis of the plurality of speakers into a direction in which part of the body of the user is located. For example, while an output audio signal is outputted via the plurality of speakers, the audio signal module 210 may obtain a user through a camera module (e.g., the camera module 180). The audio signal module 210 may identify a user's face (or ear) from an image in which the user is obtained. The audio signal module 210 may change the directional axis of the plurality of speakers into a direction corresponding to the identified user's face (or ear).

According to an embodiment, the echo processing module 220 may attenuate an output audio signal outputted from a speaker disposed in a location adjacent to a microphone, among an input audio signal received from the microphone. For example, in response to an input audio signal being obtained via a first microphone adjacent to a first speaker among a plurality of microphones, the echo processing module 220 may load tuning table information from the memory or send the audio signal module 210 a request for information about a frequency band of an output audio signal outputted from each of a plurality of speakers, thereby identifying a band of an output audio signal outputted via the first speaker. In response to the band of the output audio signal outputted via the first speaker being identified, the echo processing module 220 may identify a filter for attenuating the band of the output audio signal outputted via the first speaker. The echo processing module 220 may apply the identified filter to the input audio signal obtained through the first microphone, thereby attenuating an output audio signal component outputted from the first speaker disposed in a location adjacent to the first microphone. In the same method, the echo processing module 220 may attenuate a component of an output audio signal outputted via a speaker disposed in a location adjacent to each microphone, among an input audio signal received via another microphone.

According to an embodiment, the echo processing module 220 may mix an input audio signal which a component of an output audio signal is eliminated from, to provide a transmission audio signal. According to an embodiment, the echo processing module 220 may packetize the transmission audio signal, thereby providing information (e.g., a data packet) about the transmission audio signal to be transmitted to an external electronic device and then, transmitting the provided information about the transmission audio signal to the external electronic device via the communication module 190.

According to an embodiment, in response to a plurality of microphones including a directional microphone, the echo processing module 220 may change a directional axis of the plurality of microphones into a direction in which part of the body of the user is located. For example, while an output audio signal is outputted via a plurality of speakers, the echo processing module 220 may obtain the user through the camera module 180. The echo processing module 220 may identify a user's face (or mouth) from an image in which the user is obtained. The echo processing module 220 may change the directional axis of the plurality of microphones into a direction corresponding to the identified user's face (or mouth).

Figure 3:
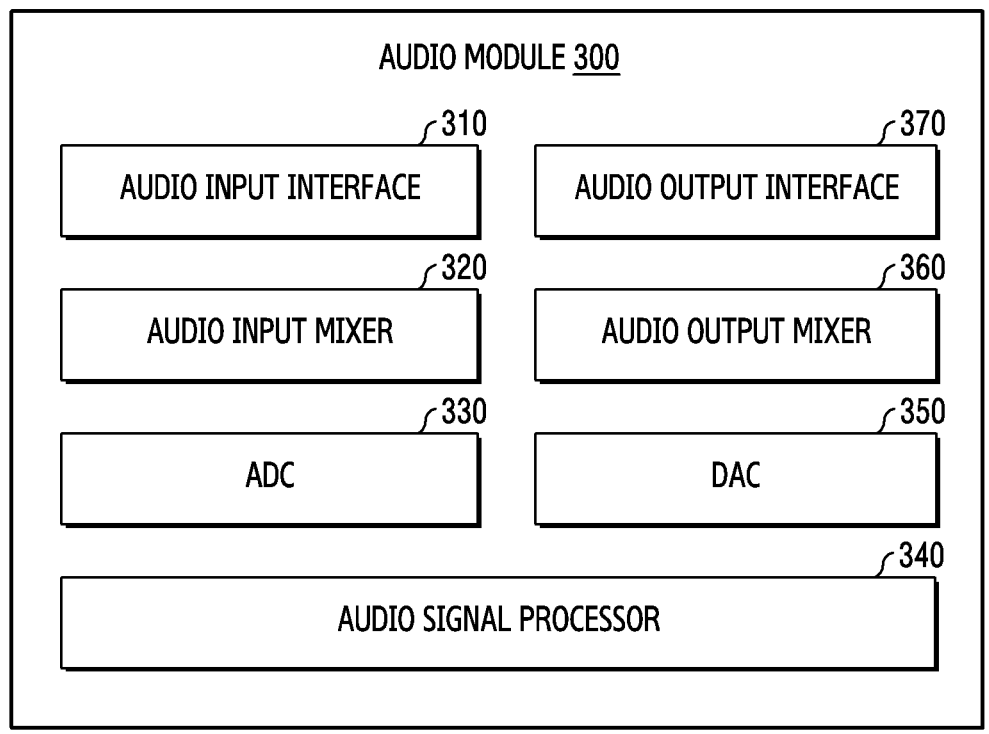
FIG. 3 is a block diagram of an audio module of providing an audio signal by using a plurality of speakers and microphones according to various embodiments.

FIG. 3 is a block diagram of an audio module of providing an audio signal by using a plurality of speakers and microphones according to various embodiments.

Referring to FIG. 3, the audio module 300 (e.g., the audio module 170) may include at least one of, for example, an audio input interface 310, an audio input mixer 320, an analog-to-digital converter (ADC) 330, an audio signal processor 340, a digital-to-analog converter (DAC) 350, an audio output mixer 360, or an audio output interface 370.

The audio input interface 310 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, in response to the audio signal being obtained from the external electronic device 102 (e.g., a headset or a microphone), the audio input interface 310 may be coupled with the external electronic device 102 wiredly via the connecting terminal 178, or wirelessly (e.g., Bluetooth communication) via the wireless communication module 192, to receive the audio signal. According to an embodiment, the audio input interface 310 may receive a control signal (e.g., a volume adjustment signal received via an input button) related to the audio signal obtained from the external electronic device 102. The audio input interface 310 may include a plurality of audio input channels, and receive a different audio signal by each audio input channel. According to an embodiment, additionally or alternatively, the audio input interface 310 may receive an audio signal from another component (e.g., the processor 120 or the memory 130) of the electronic device 101.

The audio input mixer 320 may synthesize a plurality of inputted audio signals into at least one audio signal. According to an embodiment, the audio input mixer 320 may synthesize a plurality of analog audio signals inputted via the audio input interface 310 into at least one analog audio signal.

The ADC 330 may convert an analog audio signal into a digital audio signal. According to an embodiment, the ADC 330 may convert an analog audio signal received via the audio input interface 310 or, additionally or alternatively, an analog audio signal synthesized via the audio input mixer 320 into a digital audio signal.

The audio signal processor 340 may perform various processing on a digital audio signal received via the ADC 330 or a digital audio signal received from another component of the electronic device 101. For example, the audio signal processor 340 may perform sampling rate change for one or more digital audio signals, applying of one or more filters, interpolation processing, amplification or attenuation (e.g., partial frequency band or whole frequency band amplification or attenuation) processing, noise processing (e.g., noise or echo attenuation), channel change (e.g., switching between mono and stereo), mixing, or specified signal obtaining. According to an embodiment, at least a partial function of the audio signal processor 340 may be implemented in the form of an equalizer.

The DAC 350 may convert a digital audio signal into an analog audio signal. According to an embodiment, the DAC 350 may convert a digital audio signal processed by the audio signal processor 340, or a digital audio signal acquired from another component of the electronic device 101 into an analog audio signal.

The audio output mixer 360 may synthesize a plurality of audio signals to be outputted into at least one audio signal. According to an embodiment, the audio output mixer 360 may synthesize an analog audio signal converted by the DAC 350 and another analog audio signal (e.g., an analog audio signal received via the audio input interface 310) into at least one analog audio signal.

The audio output interface 370 may output an analog audio signal converted by the DAC 350 or, additionally or alternatively, an analog audio signal synthesized by the audio output mixer 360 to the outside of the electronic device 101 via the sound output device 155 (e.g., a speaker (e.g., dynamic driver or balance armature driver), or receiver). According to an embodiment, the sound output device 155 may include a plurality of speakers, and the audio output interface 370 may output an audio signal having a plurality of mutually different channels (e.g., stereo or 5.1 channel) via at least some speakers among the plurality of speakers. According to an embodiment, the audio output interface 370 may be coupled with the external electronic device 102 (e.g., an external speaker or a headset) wiredly via the connecting terminal 178 or wirelessly via the wireless communication module 192, to output an audio signal.

According to an embodiment, the audio module 300 may provide, without separately including the audio input mixer 320 or the audio output mixer 360, at least one digital audio signal by synthesizing a plurality of digital audio signals using at least one function of the audio signal processor 340.

According to an embodiment, the audio module 300 may include an audio amplifier (not shown) (e.g., a speaker amplifying circuit) that is capable of amplifying an analog audio signal inputted via the audio input interface 310 or an audio signal that is to be outputted via the audio output interface 370. According to an embodiment, the audio amplifier may be configured as a module separate from the audio module 300.

According to an embodiment, the audio module 300 may perform a function of at least one of the audio signal module 210 and the echo processing module 220 of FIG. 2.

Figure 4:
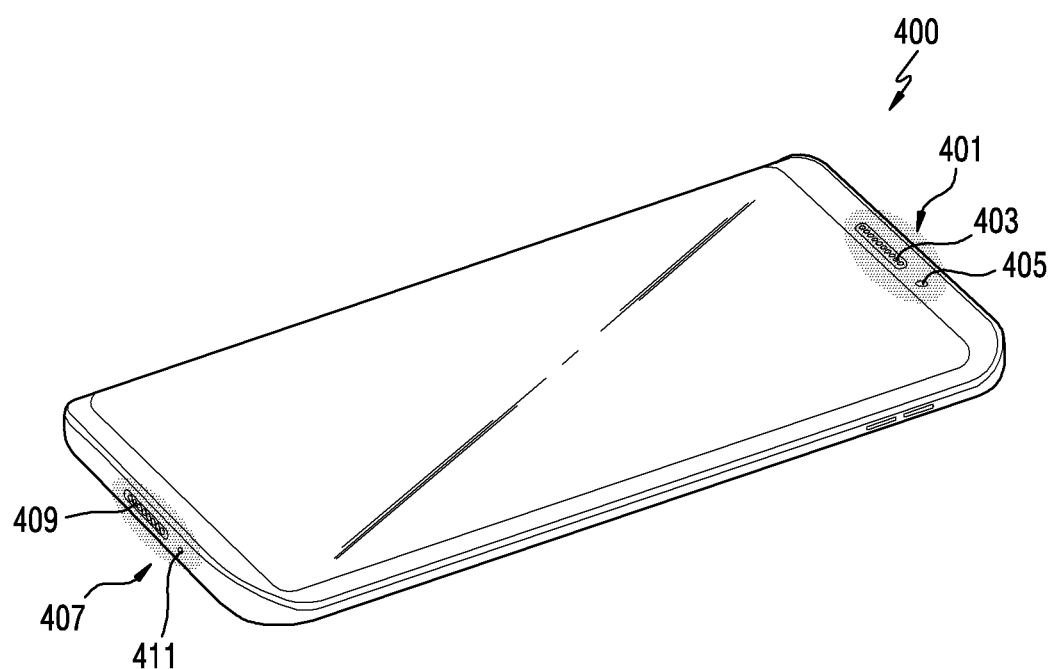
FIG. 4 is a diagram for explaining an exterior construction of an electronic device according to various embodiments.

FIG. 4 is a diagram for explaining an exterior construction of an electronic device according to various embodiments.

Referring to FIG. 4, the electronic device 400 (e.g., the electronic device 101) may include a plurality of speakers. A first speaker 403 among the plurality of speakers may be disposed in a first region 401 of a housing of the electronic device 400. And, a second speaker 409 among the plurality of speakers may be disposed in a second region 407 of the housing of the electronic device 400. For example, the first region 401 may be located at an upper part of a front surface of the housing of the electronic device 400. For example, the second region 407 may be located at a lower part of a side surface of the housing of the electronic device 400.

According to an embodiment, the electronic device 400 may include a plurality of microphones for receiving an audio signal (e.g., a user voice) that is provided in an external environment of the electronic device 400. A first microphone 405 among the plurality of microphones may be disposed in a location adjacent to the first speaker 403 disposed in the first region 401 of the housing of the electronic device 400. And, a second microphone 409 among the plurality of microphones may be disposed in a location adjacent to the second speaker 409 disposed in the second region 407 of the housing of the electronic device 400. Accordingly, a first input audio signal obtained from the first microphone 405 includes a component of an audio signal outputted from the first speaker 403 more than a component of an audio signal outputted from the second speaker 409. And, a second input audio signal obtained from the second microphone 411 may include a component of an output audio signal outputted from the second speaker 409 more than a component of an output audio signal outputted from the first speaker 403.

According to various embodiments of the disclosure, an electronic device (e.g., the electronic device 101) may include a housing, a communication module (e.g., the communication module 190), a first speaker disposed in a first region of the housing, a second speaker disposed in a second region of the housing, a first microphone disposed adjacent to the first region, a second microphone disposed adjacent to the second region, and a processor (e.g., the processor 120 or 200). The processor may be configured to receive a first audio signal from an external electronic device, by using the communication module, and output a first given frequency band among a frequency band of the first audio signal by using the first speaker, and output a second given frequency band among the frequency band of the first audio signal by using the second speaker, and provide a first signal by applying a filter capable of passing a band corresponding to the second given frequency band to an audio signal external to the electronic device which is acquired using the first microphone, and provide a second signal by applying a filter capable of passing a band corresponding to the first given frequency band to the audio signal external to the electronic device which is acquired using the second microphone, and provide a second audio signal corresponding to the external audio signal by using the first signal and the second signal, and transmit the second audio signal to the external electronic device by using the communication module.

According to various embodiments, the processor may be configured to identify a first output audio signal on the first given frequency band from the first audio signal by using the first filter configured to pass a signal on the first given frequency band, as at least part of an operation of outputting the first given frequency band, and identify a second output audio signal on the second given frequency band from the first audio signal by using the second filter configured to pass a signal on the second given frequency band, as at least part of an operation of outputting the second given frequency band.

According to various embodiments, the processor may be configured to identify the first given frequency band and the second given frequency band, based at least on tuning table information stored in a memory of the electronic device.

According to various embodiments, the processor may be configured to identify a band distribution of the first audio signal, and identify a reference frequency for dividing the first audio signal, based on the identified distribution, and identify the first given frequency band and the second given frequency band with a criterion of the reference frequency.

According to various embodiments, the first microphone and the second microphone may be comprised of a directional microphone, and the electronic device may further include at least one camera module, and the processor is configured to obtain a user of the electronic device, based at least on an image acquired through the at least one camera module, and change a directional axis of the first microphone and the second microphone into a direction corresponding to the identified user.

According to various embodiments, the first speaker and the second speaker may be comprised of a directional speaker, and the electronic device may further include at least one camera module, and the processor is configured to obtain a user of the electronic device from an image acquired through the at least one camera module, and change a directional axis of the first speaker and the second speaker into a direction corresponding to the identified user.

According to various embodiments of the disclosure, an electronic device (e.g., the electronic device 101) may include a communication module (e.g., the communication module 190), a first speaker, a second speaker, a first microphone, a second microphone, and a processor (e.g., the processor 120 or 200). The processor may be configured to output a first output audio signal on a first band, via the first speaker, and output a second output audio signal on a second band, via the second speaker, and identify a first partial audio signal on the second band within a first input audio signal obtained through the first microphone, and identify a second partial audio signal on the first band within a second input audio signal obtained through the second microphone, and provide a transmission audio signal, based at least on the first partial audio signal and the second partial audio signal, and transmit information about the transmission audio signal to an external electronic device via the communication module.

According to various embodiments, the processor may be configured to receive information about a reception audio signal from the external electronic device via the communication module, and identify the first output audio signal on the first band from the reception audio signal, and identify the second output audio signal on the second band from the reception audio signal.

According to various embodiments, the processor may be configured to identify the first output audio signal on the first band from the reception audio signal by using a first filter configured to pass a signal on the first band, and identify the second output audio signal on the second band from the reception audio signal by using a second filter configured to pass a signal on the second band.

According to various embodiments, the processor may be configured to identify the first band and the second band, based at least on turning table information stored in a memory of the electronic device.

According to various embodiments, the processor may be configured to identify a band distribution of the reception audio signal, identify a reference frequency for dividing the reception audio signal, based on the identified distribution, and identify the first band and the second band with a criterion of the reference frequency.

According to various embodiments, the first input audio signal obtained through the first microphone may include one or more of a peripheral audio signal caused within an external environment in which the electronic device is located, at least a part of the first output audio signal, or at least a part of the second output audio signal, and the second input audio signal obtained through the second microphone may include one or more of the peripheral audio signal, at least a part of the first output audio signal, or at least a part of the second output audio signal.

According to various embodiments, the first microphone and the second microphone may be comprised of a directional microphone, and the electronic device may further include at least one camera module, and the processor may be configured to obtain a user of the electronic device, based on an image acquired through the at least one camera module, and change a directional axis of the first microphone and the second microphone into a direction corresponding to the user.

According to various embodiments, the first speaker and the second speaker may be comprised of a directional speaker, and the electronic device may further include at least one camera module, and the processor may be configured to obtain a user of the electronic device, based on an image acquired through the at least one camera module, and change a directional axis of the first speaker and the second speaker into a direction corresponding to the user.

According to various embodiments, the electronic device may further include a housing, and the first speaker and the first microphone may be located in a first region of the housing, and the second speaker and the second microphone may be located in a second region of the housing.

Figure 5:
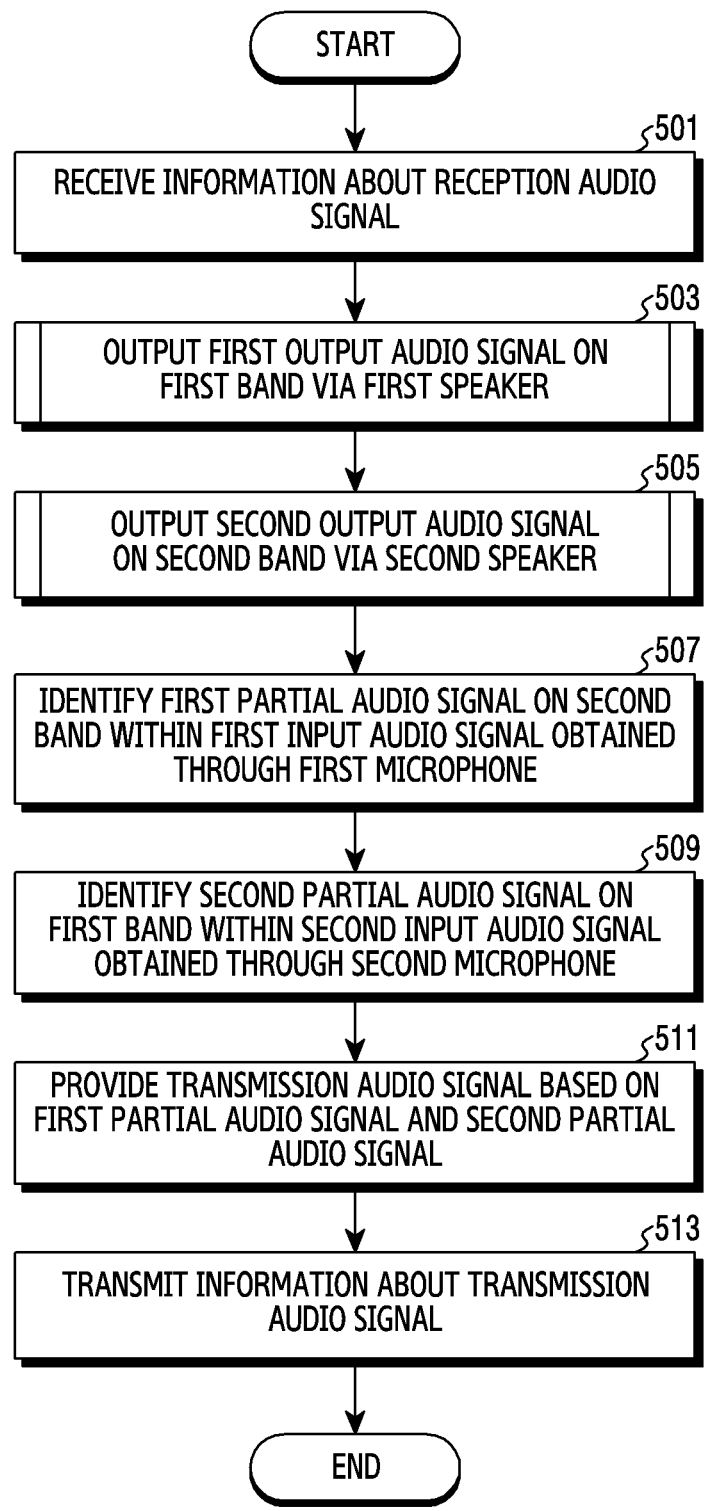
FIG. 5 is a flowchart illustrating a method for canceling an echo in an electronic device according to various embodiments.
Figure 6A:
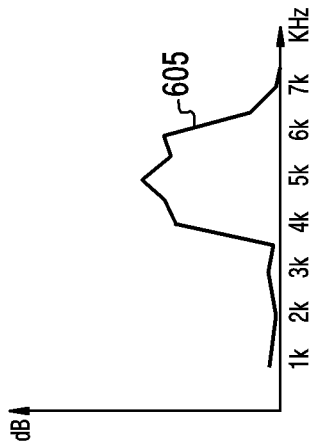
FIG. 6 is a diagram for explaining an output audio signal outputted via a speaker in an electronic device according to various embodiments.
Figure 6B:
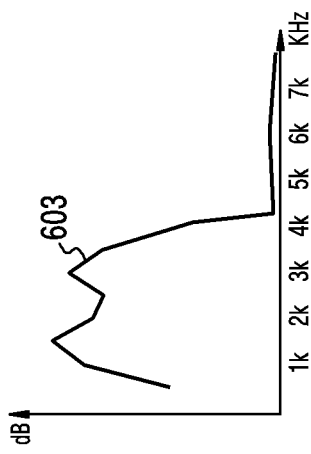
Figure 6C:
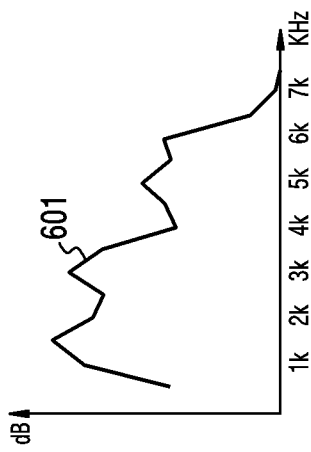

FIG. 5 is a flowchart illustrating a method for canceling an echo in an electronic device according to various embodiments. FIG. 6 is a diagram for explaining an output audio signal outputted via a speaker in the electronic device according to various embodiments. FIG. 7 is a diagram for explaining an input audio signal obtained through a microphone in the electronic device according to various embodiments. In the following description, the electronic device may include a part or whole of the electronic device 101 of FIG. 1.

Referring to FIG. 5, in operation 501, a processor (e.g., the processor 120 or 200) of the electronic device (e.g., the electronic device 101) may receive information about a reception audio signal. For example, in response to obtaining an input for call connection (or video conference connection) through an input device (e.g., the input device 150) or receiving a request for call connection (or video conference connection) via a communication module (e.g., the communication module 190), the processor may perform communication connection with an external electronic device. The processor may receive information (e.g., packet data related to a voice signal) about a reception audio signal from the communication-connected external electronic device via the communication module. The processor may identify the reception audio signal from the information about the reception audio signal.

In operation 503, the processor may output a first output audio signal on a first band via a first speaker. For example, the processor may acquire a reception audio signal 601 of a form of FIG. 6(*a*), based on information about the reception audio signal 601. The processor may identify a first band (e.g., 4 KHz or less) to be outputted via the first speaker, based on tuning table information stored in a memory (e.g., the memory 130). In response to the first band being identified, as in FIG. 6(*b*), the processor may identify a first output audio signal 603 in which the remaining band excepting the first band is attenuated from the reception audio signal 601. The processor may output the identified first output audio signal 603 via the first speaker. In this case, according as the first speaker uses limited output energy for outputting only a partial band among the whole band of the audio signal, the first speaker may output the audio signal with a greater volume than when outputting the whole band of the audio signal. For another example, in response to obtaining the occurrence of a call event or video conference event, the processor may receive information about a reception audio signal from an external electronic device via the communication module. The processor may apply a bandwidth extension (BWE) solution to the reception audio signal, to provide an audio signal of a high band higher than a band of the reception audio signal (or a low band lower than the band of the reception audio signal). The processor may identify, as the first band, one of the band of the reception audio signal or the provided high band (or low band), and output an audio signal on the identified first band via the first speaker.

In operation 505, the processor may output a second output audio signal on a second band via a second speaker. For example, the processor may identify the second band (e.g., exceeding 4 KHz) to be outputted via the second speaker, based on the tuning table information stored in the memory (e.g., the memory 130). In response to the second band being identified, as in FIG. 6(*c*), the processor may identify a second output audio signal 605 in which the remaining band excepting the second band is attenuated from the reception audio signal 601. The processor may output the identified second output audio signal 605 via the second speaker. In this case, according as the second speaker uses limited output energy for outputting only a partial band among the whole band of the audio signal, the second speaker may output the audio signal of a greater volume than when outputting the whole band. For another example, the processor may apply a bandwidth extension (BWE) solution to a reception audio signal, to provide an audio signal of a high band higher than (or low band lower than) a band of the reception audio signal. The processor may identify, as the second band, a band different from the first band to be outputted via the first speaker among the band of the reception audio signal, or the provided high band (or low band), and output an audio signal on the identified second band via the second speaker.

In operation 507, the processor may identify a first signal on the second band within a first input audio signal obtained through a first microphone. For example, the processor may obtain, via the first microphone, a first input audio signal 703 which includes one or more components among the first output audio signal 603 outputted from the first speaker, the second output audio signal 605 outputted from the second speaker, or a peripheral audio signal 701 (e.g., a user's voice, a peripheral noise, etc.) caused within an external environment in which the electronic device is located as in FIG. 7(*a*). Here, the first microphone may be disposed in a location which is adjacent to the first speaker and is spaced a specific distance or more apart from the second speaker. Accordingly, the first input audio signal 703 obtained from the first microphone may include a component of the first output audio signal 603 relatively more than a component of the second output audio signal 605. Accordingly, the processor may attenuate the component of the first output audio signal 603 having greater influence on an echo phenomenon (e.g., attenuate a band of 4 KHz or less), thereby identifying a first partial audio signal 707 of a form of FIG. 7(*d*).

In operation 509, the processor may identify a second partial audio signal on the first band within a second input audio signal obtained through a second microphone. For example, the processor may obtain, via the second microphone, a second input audio signal 705 which includes one or more components among the first output audio signal 603 outputted from the first speaker, the second output audio signal 605 outputted from the second speaker, or the peripheral audio signal 701 caused within the external environment in which the electronic device is located. Here, the second microphone may be disposed in a location which is adjacent to the second speaker and is spaced a specific distance or more apart from the first speaker. Accordingly, the second input audio signal 705 obtained from the second microphone may include the component of the second output audio signal 605 relatively more than the component of the first output audio signal 603. Accordingly, the processor may attenuate the component of the second output audio signal 605 having greater influence on the echo phenomenon (e.g., attenuate a band exceeding 4 KHz), thereby identifying a second partial audio signal 709 of a form of FIG. 7(*e*).

In operation 511, the processor may provide a transmission audio signal, based on the first partial audio signal and the second partial audio signal. For example, the processor may mix the first partial audio signal 707 in which the first band is attenuated from the first input audio signal 703 obtained through the first microphone and the second partial audio signal 709 in which the second band is attenuated from the second input audio signal 705 obtained through the second microphone, to provide a transmission audio signal 711 of a form of FIG. 7(*f*).

In operation 513, the processor may transmit information about the transmission audio signal via the communication module. For example, the processor may packetize the transmission audio signal. The processor may transmit information about the packetized transmission audio signal to the external electronic device via the communication module.

According to various embodiments, the first band and the second band may include a discontinuous frequency band as well. For example, the first band may include a band of 0 KHz to 2 KHz and a band of 4 KHz to 6 KHz among a band of a reception audio signal. And, the second band may include the remaining bands (e.g., a band of 2 KHz to 4 KHz and a band exceeding 6 KHz) not included in the first band among the band of the reception audio signal as well.

According to various embodiments, the processor may refine the tuning table information, based on received information. For example, the processor may display a user interface which is capable of refining a setting value of the tuning table information through the display device 160, based on a user's input obtained through an input device (e.g., the input device 150). The processor may additionally receive a user's input to the user interface through the input device, and refine setting values of the first band and second band which are set to the turning table information in accordance with the received input. For another example, the processor may receive information for refining the tuning table information from the communication module (e.g., the communication module 190), and refine the setting values of the first band and second band which are set to the tuning table information, based on the received information.

According to various embodiments, the processor may analyze the band of the reception audio signal, and identify the first band and the second band, based on the analyzed result as well. For example, the processor may analyze the band of the reception audio signal, to identify a median value of the band of the reception audio signal as a reference frequency. The processor may identify a frequency band exceeding the reference frequency as the first band, and identify a frequency band equal to or less than the reference frequency as the second band as well.

According to various embodiments, the first speaker and the second speaker may include a directional speaker. In this case, the processor may identify whether a user of the electronic device is photographed by using at least one camera module (e.g., the camera module 180) disposed in at least one of a front surface or rear surface of the housing of the electronic device. In response to the user of the electronic device being photographed, the processor may identify part (e.g., a face, an ear, etc.) of the body of the user from the photographed image. The processor may identify a direction corresponding to the identified part of the body of the user, and set a directional axis of the first speaker and the second speaker to face the identified direction. Accordingly, the electronic device may prevent an output audio signal outputted from the first speaker and second speaker from being introduced into a plurality of microphones, and may provide more loud and exact audio signal to the user of the electronic device. In response to the user not being photographed through the at least one camera module, the processor may continuously perform an operation of obtaining the user during a given time (e.g., a time for which call connection is maintained, a time for which video conference connection is performed, or a preset time).

According to various embodiments, the first microphone and the second microphone may include a directional microphone. In this case, the processor may identify whether the user of the electronic device is obtained by using at least one camera module (e.g., the camera module 180) disposed in the front surface or rear surface of the housing of the electronic device. In response to the user of the electronic device being obtained, the processor may identify part (e.g., a face, a mouth, etc.) of the body of the user from the photographed image. The processor may identify a direction corresponding to the identified part of the body of the user, and set a directional axis of the first microphone and the second microphone to the identified direction. Accordingly, the electronic device may decrease a component of an output audio signal introduced from a speaker disposed in a location adjacent to the microphone, and also may more accurately obtain a voice signal of the user of the electronic device. In response to the user not being photographed through the at least one camera module, the processor may continuously perform an operation of obtaining the user during a given time (e.g., a time for which call connection is maintained, a time for which video conference connection is performed, or a preset time).

According to various embodiments, in response to the first speaker and the second speaker including the directional speaker, and the first microphone and the second microphone including the directional microphone, the processor may set the directional axis of the first speaker and second speaker and the directional axis of the first microphone and second microphone to a direction corresponding to part of the body of the user. For example, the processor may identify whether the user of the electronic device is obtained by using at least one camera module (e.g., the camera module 180) disposed in the front surface or rear surface of the housing of the electronic device. In response to the user of the electronic device being obtained, the processor may identify part (e.g., a face, a mouth, etc.) of the body of the user of the electronic device from the photographed image. The processor may set the directional axis of the first speaker and second speaker and the directional axis of the first microphone and second microphone to a direction corresponding to the identified part of the body of the user, and may provide more loud and exact audio signal to the user of the electronic device. In response to the user not being photographed through the at least one camera module, the processor may continuously perform an operation of obtaining the user during a given time (e.g., a time for which call connection is maintained, a time for which video conference connection is performed, or a preset time).

Figure 8:
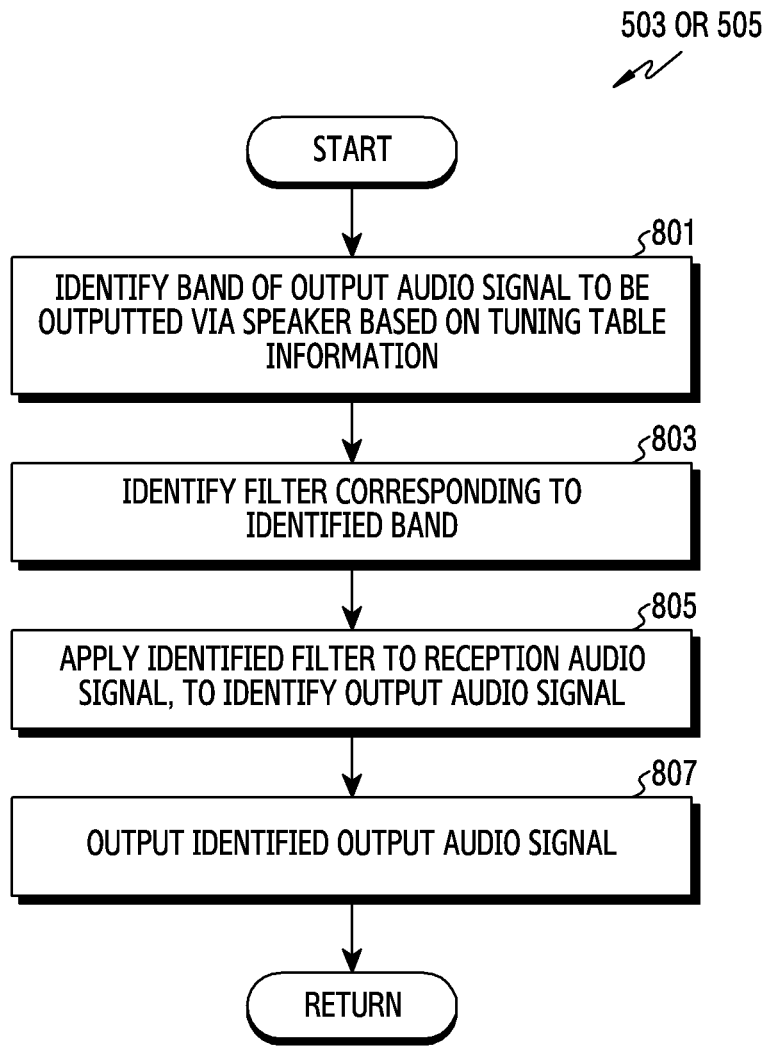
FIG. 8 is a flowchart illustrating an example of a method of outputting an output audio signal via a speaker in an electronic device according to various embodiments.

FIG. 8 is a flowchart illustrating an example of a method of outputting an output audio signal via a speaker in an electronic device according to various embodiments. In the following description, the electronic device may include a part or whole of the electronic device 101 of FIG. 1.

Referring to FIG. 8, in operation 801, a processor (e.g., the processor 120 or 200) of the electronic device (e.g., the electronic device 101) may identify a band of an output audio signal to be outputted via a speaker, based on tuning table information. For example, the processor may load the tuning table information from the memory 130. The processor may identify a band which is set every each speaker or a band which is set to a specified speaker from the tuning table information, thereby identifying a band of an output audio signal to be outputted via the specified speaker (e.g., the first speaker or the second speaker). Here, the tuning table information may be previously stored, and may be refined based on a user's input or information received from an external electronic device.

In operation 803, the processor may identify a filter corresponding to the identified band. For example, in response to the band of the output audio signal outputted via the specified speaker being 4 KHz or less, the processor may identify a 4 KHz low pass filter as the filter corresponding to the identified band. For another example, in response to the band of the output audio signal outputted via the specified speaker exceeding 4 KHz, the processor may identify a 4 KHz high pass filter as the filter corresponding to the identified band.

In operation 805, the processor may apply the identified filter to a reception audio signal, to identify an output audio signal. For example, in response to the 4 KHz low pass filter being identified, the processor may apply the 4 KHz low pass filter to the reception audio signal, to identify an output audio signal in which an output audio signal of a band exceeding 4 KHz is attenuated. For another example, in response to the 4 KHz high pass filter being identified, the processor may apply the 4 KHz high pass filter to the reception audio signal, to identify an output audio signal in which an output audio signal of a band of 4 KHz or less is attenuated.

In operation 807, the processor may output the identified output audio signal via the speaker. In this case, according as an audio signal of a partial band among a band of the reception audio signal is outputted, the speaker may output the audio signal with a greater volume than when the band of the reception audio signal is all outputted.

Figure 9:
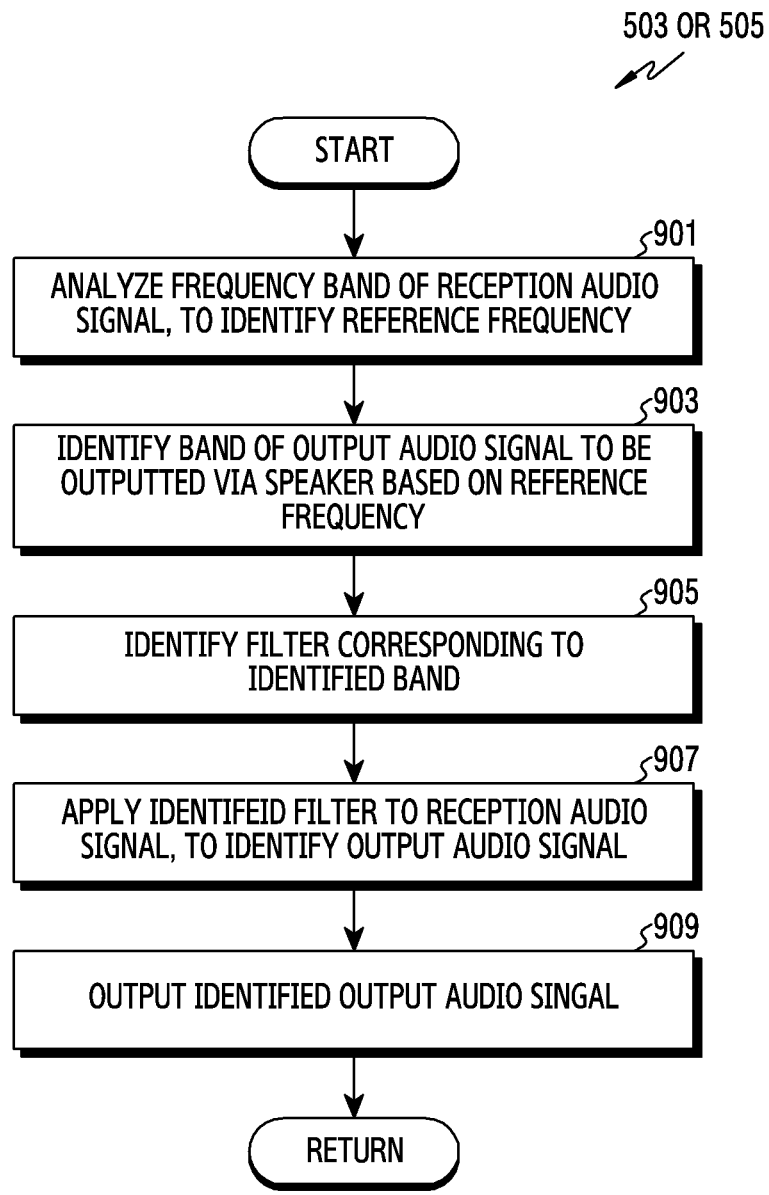
FIG. 9 is a flowchart illustrating another example of a method of outputting an output audio signal via a speaker in an electronic device according to various embodiments.

FIG. 9 is a flowchart illustrating another example of a method of outputting an output audio signal via a speaker in an electronic device according to various embodiments. In the following description, the electronic device may include a part or whole of the electronic device 101 of FIG. 1.

Referring to FIG. 9, in operation 901, a processor (e.g., the processor 120 or 200) of the electronic device (e.g., the electronic device 101) may analyze a frequency band of a reception audio signal, to identify a reference frequency. For example, in response to the frequency band of the reception audio signal being 0 KHz to 8 KHz, the processor may identify, as the reference frequency, 4 KHz which is a median value of the frequency band of the reception audio signal. For another example, in response to the frequency band of the reception audio signal being 0 KHz to 20 KHz, the processor may identify, as the reference frequency, 10 KHz which is a median value of the frequency band of the reception audio signal.

In operation 903, the processor may identify a band of an output audio signal to be outputted via a speaker, based on the reference frequency. For example, the processor may identify a band of the reference frequency or less as the band of the output audio signal. For another example, the processor may identify a band exceeding the reference frequency as the band of the output audio signal. According to an embodiment, the processor may identify the band of the output audio signal such that a plurality of speakers may output audio signals of mutually different bands respectively.

In operation 905, the processor may identify a filter corresponding to the identified band. For example, in response to it being identified that the reference frequency is 4 KHz and the band of the output audio signal is the band of the reference frequency or less, the processor may identify a 4 KHz low pass filter as the filter corresponding to the identified band.

In operation 907, the processor may apply the identified filter to the reception audio signal, to identify an output audio signal. For example, in response to the 4 KHz low pass filter being identified, the processor may apply the 4 KHz low pass filter to the reception audio signal, to identify an output audio signal in which an output audio signal of a band exceeding 4 KHz is attenuated.

In operation 909, the processor may output the identified output audio signal via the speaker. In this case, according as an audio signal of a partial band among the band of the reception audio signal is outputted, the speaker may output the audio signal with a greater volume than when the band of the reception audio signal is all outputted.

Figure 10:
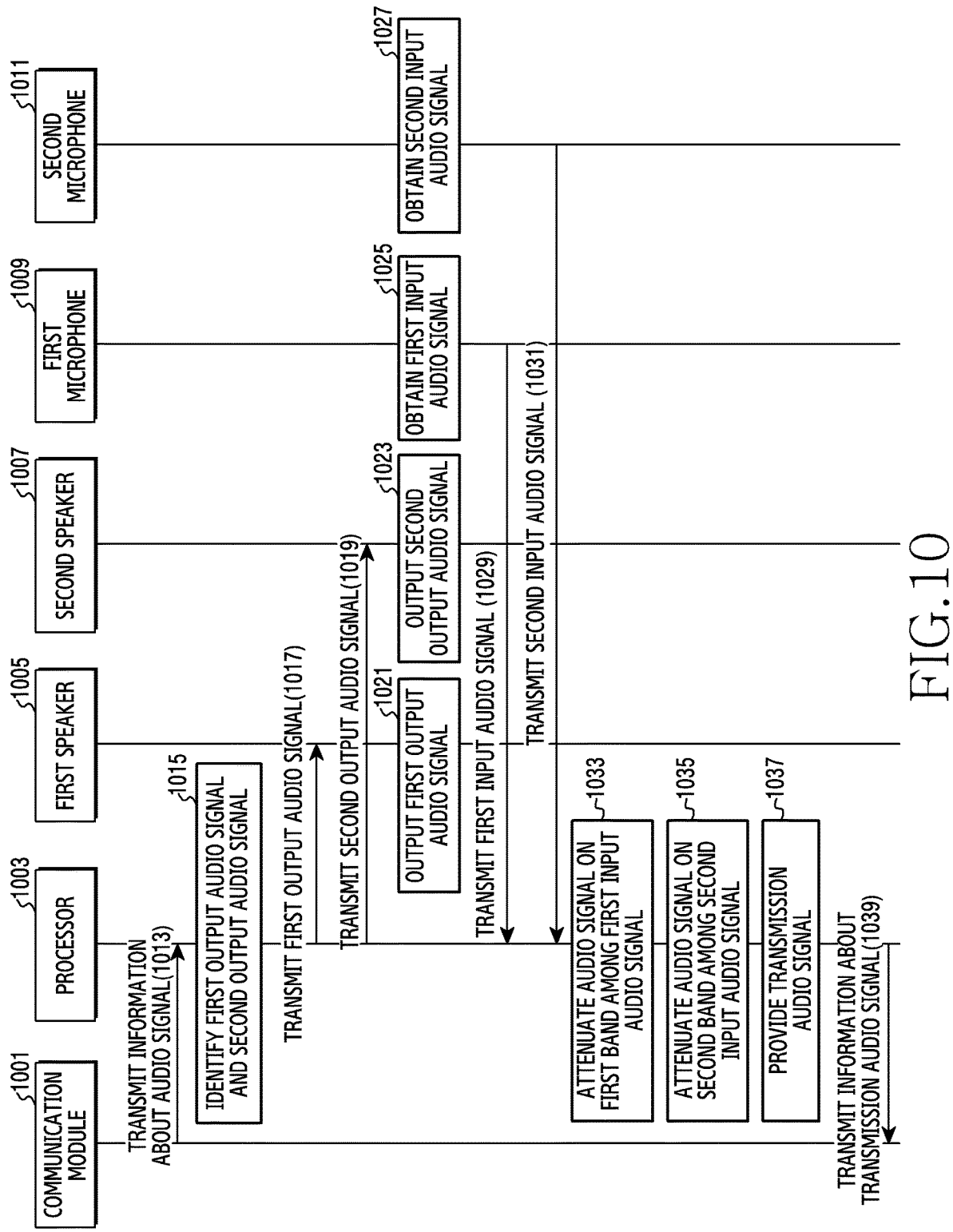
FIG. 10 is a signal flow diagram of a method for canceling an echo in an electronic device according to various embodiments.

FIG. 10 is a signal flow diagram of a method for canceling an echo in an electronic device according to various embodiments. In the following description, the electronic device may include a part or whole of the electronic device 101 of FIG. 1.

Referring to FIG. 10, in operation 1013, in response to receiving information (e.g., packet data related to a voice signal) about a reception audio signal from an external electronic device (e.g., the electronic device 104, the server 108), a communication module 1001 (e.g., the communication module 190) of the electronic device (e.g., the electronic device 101) may transmit the information about the reception audio signal to a processor 1003 (e.g., the processor 120 or 200) of the electronic device.

In operation 1015, in response to receiving the information about the reception audio signal from the communication module 1001, the processor 1003 may identify the reception audio signal, based on the information about the reception audio signal, and identify a first output audio signal and a second output audio signal from the identified reception audio signal. For example, the processor 1003 may apply, to the reception audio signal, a first filter for maintaining an audio signal on a first band among the reception audio signal, and attenuating an audio signal on a second band, thereby identifying the first output audio signal. The processor 1003 may apply, to the reception audio signal, a second filter for maintaining the audio signal on the second band among the reception audio signal, and attenuating the audio signal on the first band, thereby identifying the second output audio signal.

In operation 1017, the processor 1003 may transmit the first output audio signal to the first speaker 1005 of the electronic device, and in operation 1019, may transmit the second output audio signal to the second speaker 1007 of the electronic device.

In operation 1021, the first speaker 1005 may output the received first output audio signal, and in operation 1023, the second speaker 1007 may output the received second output audio signal.

In operation 1025, a first microphone 1009 of the electronic device may obtain a first input audio signal. For example, the first microphone 1009 may obtain at least a part of the first output audio signal outputted from the first speaker 1005 disposed in a location adjacent to the first microphone 1009. The first microphone 1009 may additionally obtain at least one of an audio signal (e.g., a user voice) provided by a peripheral environment of the electronic device or the second output audio signal outputted from the second speaker 1107, besides the first output audio signal outputted from the first speaker 1005 as well.

In operation 1027, a second microphone 1011 may obtain a second input audio signal. For example, the second microphone 1011 may obtain at least a part of the second output audio signal outputted from the second speaker 1007 disposed in a location adjacent to the second microphone 1011. The second microphone 1011 may additionally obtain at least one of an audio signal (e.g., a user voice) provided by a peripheral environment of the electronic device or the first output audio signal outputted from the first speaker 1005, besides the second output audio signal outputted from the second speaker 1007 as well.

In operation 1029, the first microphone 1009 may transmit the first input audio signal (e.g., at least one of the second output audio signal or the audio signal provided by the peripheral environment of the electronic device, and the first output audio signal) to the processor 1003. Here, the first input audio signal transmitted from the first microphone 1009 may include a component of the first output audio signal more than a component of the second output audio signal.

In operation 1031, the second microphone 1011 may transmit the second input audio signal (e.g., at least one of the first output audio signal or the audio signal provided by the peripheral environment of the electronic device, and the second output audio signal) to the processor 1003. The second input audio signal received from the second microphone 1011 may include a component of the second output audio signal more than a component of the first output audio signal.

In operation 1033, the processor 1003 may attenuate an audio signal on a first band having a high possibility of causing an echo phenomenon among the first input audio signal received from the first microphone 1009. For example, the processor 1003 may apply a first filter for attenuating the audio signal on the first band to the first input audio signal, thereby attenuating the audio signal on the first band.

In operation 1035, the processor 1003 may attenuate an audio signal on a second band having a high possibility of causing the echo phenomenon among the second input audio signal received from the second microphone 1011. For example, the processor 1003 may apply a second filter for attenuating the audio signal on the second band to the second input audio signal, thereby attenuating the audio signal on the second band.

In operation 1037, the processor 1003 may mix the first input audio signal in which the audio signal on the first band is decreased and the second input audio signal in which the audio signal on the second band is decreased, thereby providing a transmission audio signal. In response to the transmission audio signal being provided, the processor 1003 may packetize the provided transmission audio signal, thereby providing information about the transmission audio signal.

In operation 1039, the processor 1003 may transmit the information about the transmission audio signal to the communication module 1001. The communication module 1001 may transmit the information about the transmission audio signal received from the processor 1003, to the external electronic device.

According to various embodiment of the disclosure, an operation method of an electronic device (e.g., the electronic device 101) may include receiving a first audio signal (e.g., a reception audio signal) from an external electronic device, and outputting a first given frequency band among a frequency band of the first audio signal (e.g., outputting a first output audio signal on a first band) by using a first speaker, and outputting a second given frequency band among the frequency band of the first audio signal (e.g., outputting a second output audio signal on a second band) by using a second speaker, and provide a first signal (e.g., a first partial audio signal) by applying a filter capable of passing a band corresponding to the second given frequency band to an audio signal external to the electronic device which is acquired using the first microphone, and provide a second signal (e.g., a first partial audio signal) by applying a filter capable of passing a band corresponding to the first given frequency band to the audio signal external to the electronic device which is acquired using the second microphone, and provide a second audio signal (e.g., a transmission audio signal) corresponding to the external audio signal by using the first signal and the second signal, and transmit the second audio signal to the external electronic device.

According to various embodiments, outputting the first given frequency band may further include identifying a first output audio signal on the first given frequency band from the first audio signal by using the first filter configured to pass a signal on the first given frequency band. Outputting the second given frequency band may further include identifying a second output audio signal on the second given frequency band from the first audio signal by using the second filter configured to pass a signal on the second given frequency band.

According to various embodiments, the operation method of the electronic device may further include identifying the first given frequency band and the second given frequency band, based at least on tuning table information stored in a memory of the electronic device.

According to various embodiments, the operation method of the electronic device may further include identifying a band distribution of the first audio signal, and identifying a reference frequency for dividing the first audio signal, based on the identified distribution, and identifying the first given frequency band and the second given frequency band with a criterion of the reference frequency.

According to various embodiments, the operation method of the electronic device may further include obtaining a user of the electronic device, based at least on an image acquired through at least one camera module, and changing a directional axis of the first microphone and the second microphone into a direction corresponding to the identified user.

According to various embodiments, the operation method of the electronic device may further include obtaining a user of the electronic device from an image acquired through the at least one camera module, and changing a directional axis of the first speaker and the second speaker into a direction corresponding to the identified user.

According to various embodiment of the disclosure, an operation method of an electronic device (e.g., the electronic device 101) may include outputting a first output audio signal on a first band, via a first speaker, and outputting a second output audio signal on a second band, via a second speaker, and identifying a first partial audio signal on the second band within a first input audio signal obtained through a first microphone, and identifying a second partial audio signal on the first band within a second input audio signal obtained through a second microphone, and providing a transmission audio signal, based at least on the first partial audio signal and the second partial audio signal, and transmitting information about the transmission audio signal to an external electronic device.

According to various embodiments, the operation method of the electronic device may further include receiving information about a reception audio signal from the external electronic device, and identifying the first output audio signal on the first band from the reception audio signal, and identifying the second output audio signal on the second band from the reception audio signal.

According to various embodiments, identifying the second partial audio signal on the first band may include identifying the first output audio signal on the first band from the reception audio signal by using a first filter configured to pass a signal on the first band, and identifying the first partial audio signal on the second band may include identifying the second output audio signal on the second band from the reception audio signal by using a second filter configured to pass a signal on the second band.

According to various embodiments, the operation method of the electronic device may further include identifying the first band and the second band, based at least on tuning table information stored in a memory of the electronic device.

According to various embodiments, the operation method of the electronic device may further include identifying a band distribution of the reception audio signal, and identifying a reference frequency for dividing the reception audio signal, based on the identified distribution, and identifying the first band and the second band with a criterion of the reference frequency.

The electronic device according to various embodiments disclosed in the present document may be devices of various types. The electronic device may include, for example, at least one of a portable communication device (e.g., a smart phone), a computer device, a portable multimedia device, a portable medical device, a camera, a wearable device, or a home appliance. The electronic device according to an embodiment of the present document is not limited to the aforementioned devices.

Various embodiments of the present document and the terms used herein are not to limit the technology mentioned in the present document to a specified embodiment form, and should be construed as including various changes, equivalents, and/or alternatives of the corresponding embodiment. In relation to a description of the drawing, like reference symbols may be used for like components. The expression of the singular may include the expression of the plural unless otherwise dictating clearly in context. In the present document, the expressions "A or B", "at least one of A and/or B", "A, B or C", "at least one of A, B and/or C" or the like may include all available combinations of words enumerated together. The expressions "a first", "a second", "the first", "the second" or the like may use corresponding components irrespective of order and/or importance, and are nothing but used to distinguish a component from another component without limiting the corresponding components. When it is mentioned that any (e.g., a first) component is "(operatively or communicatively) coupled with/to" or is "connected to" another (e.g., a second) component, the any component may be directly coupled to the another component, or be coupled via a further component (e.g., a third component).

The term "module" used in the present document may include a unit consisting of hardware, software or firmware, and may be, for example, used interchangeably with the term "logic", "logic block", "part", "circuitry" or the like. The "module" may be an integral part or the minimum unit performing one or more functions or a portion thereof. For example, the module may consist of an application-specific integrated circuit (ASIC).

Various embodiments of the present document may be implemented by software (e.g., the program 140) which includes an instruction stored in a machine (e.g., computer)—readable storage media (e.g., the internal memory 136 or the external memory 138). The machine may be a device loading the stored instruction from the storage media and operable according to the loaded instruction, and may include an electronic device (e.g., the electronic device 101) of the disclosed embodiments. In response to the command being executed by a processor (e.g., the processor 120), the processor may perform a function corresponding to the command by itself or by using other components under the control of the processor. The command may include a code that is provided or executed by a compiler or interpreter. The machine-readable storage media may be provided in the form of a non-transitory storage media. Here, 'non-transitory' just signifies that the storage media do not include a signal and is tangible and does not distinguish that data is stored in the storage media semi-permanently or temporarily.

According to an embodiment, a method according to various embodiments disclosed in the present document may be included and provided in a computer program product. The computer program product may be traded as a product between a seller and a buyer. The computer program product may be distributed on-line in the form of a machine-readable storage media (e.g., compact disc read only memory (CD-ROM)), or through an application store (e.g., PlayStore™). In response to being distributed online, at least part of the computer program product may be at least temporarily stored or be temporarily provided in the machine-readable storage media, such as a memory of the manufacturer's server, a server of the application store, or a relay server.

Components (e.g., modules or programs) according to various embodiments may each consist of a single or plurality of entities, and some sub components among the aforementioned corresponding sub components may be omitted, or other sub components may be further included in various embodiments. Alternatively or additionally, some components (e.g., modules or programs) may be integrated into one entity, to identically or similarly perform a function carried out by each of the corresponding components non-integrated. Operations carried out by a module, a program or a different component according to various embodiments may be executed in a sequential, parallel, repeated or heuristic manner, or at least some operations may be executed in different order or be omitted, or another operation may be added.

What is claimed is:

1. An electronic device comprising:
a communication module;
a first speaker;
a second speaker;
a first microphone;
a second microphone; and
a processor,
wherein the processor is configured to:
  output a first output audio signal on a first band, via the first speaker;
  output a second output audio signal on a second band, via the second speaker;
  identify a first partial audio signal on the second band within a first input audio signal obtained through the first microphone;
  identify a second partial audio signal on the first band within a second input audio signal obtained through the second microphone;
  provide a transmission audio signal, based at least on the first partial audio signal and the second partial audio signal; and
  transmit information about the transmission audio signal to an external electronic device via the communication module,
  wherein the first input audio signal obtained through the first microphone comprises one or more of a peripheral audio signal caused within an external environment in which the electronic device is located, at least a part of the first output audio signal, or at least a part of the second output audio signal, and
  the second input audio signal obtained through the second microphone comprises one or more of the peripheral audio signal, at least a part of the first output audio signal, or at least a part of the second output audio signal.

2. The electronic device of claim 1, wherein the processor is configured to:
receive information about a reception audio signal from the external electronic device via the communication module;
identify the first output audio signal on the first band from the reception audio signal; and
identify the second output audio signal on the second band from the reception audio signal.

3. The electronic device of claim 2, wherein the processor is configured to:
identify the first output audio signal on the first band from the reception audio signal by using a first filter configured to pass a signal on the first band; and
identify the second output audio signal on the second band from the reception audio signal by using a second filter configured to pass a signal on the second band.

4. The electronic device of claim 2, wherein the processor is configured to identify the first band and the second band, based at least on turning table information stored in a memory of the electronic device.

5. The electronic device of claim 2, wherein the processor is configured to:
identify a band distribution of the reception audio signal;
identify a reference frequency for dividing the reception audio signal, based on the identified band distribution; and
identify the first band and the second band with a criterion of the reference frequency.

6. The electronic device of claim 1, wherein the first microphone and the second microphone are comprised of a directional microphone,
the electronic device further comprises at least one camera module, and
the processor is configured to:
obtain a user of the electronic device, based on an image acquired through the at least one camera module; and
change a directional axis of the first microphone and the second microphone into a direction corresponding to the user.

7. The electronic device of claim 1, wherein the first speaker and the second speaker are comprised of a directional speaker,
the electronic device further comprises at least one camera module, and
the processor is configured to:
obtain a user of the electronic device, based on an image acquired through the at least one camera module; and
change a directional axis of the first speaker and the second speaker into a direction corresponding to the user.

8. The electronic device of claim 1, further comprising a housing,
wherein the first speaker and the first microphone are located in a first region of the housing, and
the second speaker and the second microphone are located in a second region of the housing.

9. A method for canceling an echo in an electronic device, the method comprising:
outputting a first output audio signal on a first band, via a first speaker;
outputting a second output audio signal on a second band, via a second speaker;
identifying a first partial audio signal on the second band within a first input audio signal obtained through a first microphone;
identifying a second partial audio signal on the first band within a second input audio signal obtained through a second microphone;
providing a transmission audio signal, based at least on the first partial audio signal and the second partial audio signal; and
transmitting information about the transmission audio signal to an external electronic device,
wherein the first input audio signal obtained through the first microphone comprises one or more of a peripheral audio signal caused within an external environment in which the electronic device is located, at least a part of the first output audio signal, or at least a part of the second output audio signal, and
the second input audio signal obtained through the second microphone comprises one or more of the peripheral audio signal, at least a part of the first output audio signal, or at least a part of the second output audio signal.

10. The method of claim 9, further comprising:
receiving information about a reception audio signal from the external electronic device;
identifying the first output audio signal on the first band from the reception audio signal; and
identifying the second output audio signal on the second band from the reception audio signal.

11. The method of claim 10, wherein identifying the first partial audio signal on the first band comprises identifying the first output audio signal on the first band from the reception audio signal by using a first filter configured to pass a signal on the first band, and
identifying the second partial audio signal on the second band comprises identifying the second output audio signal on the second band from the reception audio signal by using a second filter configured to pass a signal on the second band.

12. The method of claim 10, further comprising identifying the first band and the second band, based at least on tuning table information stored in a memory of the electronic device.

13. The method of claim 10, further comprising:
identifying a band distribution of the reception audio signal;
identifying a reference frequency for dividing the reception audio signal, based on the identified band distribution; and
identifying the first band and the second band with a criterion of the reference frequency.

* * * * *